(12) United States Patent
Kikukawa et al.

(10) Patent No.: US 6,335,502 B1
(45) Date of Patent: Jan. 1, 2002

(54) VACUUM SWITCH AND VACUUM SWITCH GEAR USING THE VACUUM SWITCH

(75) Inventors: Shuichi Kikukawa; Tooru Tanimizu, both of Hitachi; Minoru Kanoi, Tokai-mura; Makoto Tazawa; Takuya Miyo, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/462,989

(22) PCT Filed: Sep. 29, 1999

(86) PCT No.: PCT/JP99/05334

§ 371 Date: Jan. 19, 2000

§ 102(e) Date: Jan. 19, 2000

(87) PCT Pub. No.: WO00/21108

PCT Pub. Date: Apr. 13, 2000

(30) Foreign Application Priority Data

Oct. 2, 1998 (JP) .......................................... 10-280670

(51) Int. Cl.[7] .............................................. H01H 33/66
(52) U.S. Cl. ........................ 218/118; 218/119; 218/152; 218/9; 218/10
(58) Field of Search ........................ 218/1–12, 118–120, 218/139, 140, 152–154

(56) References Cited

U.S. PATENT DOCUMENTS

| 3,792,213 A | * | 2/1974 | Kane et al. ............. 200/144 B |
| 3,814,882 A | | 6/1974 | Harrold ................... 200/144 B |
| 3,839,612 A | * | 10/1974 | Badey et al. ............ 200/144 B |
| 4,297,553 A | * | 10/1981 | Kawaguchi et al. ........ 200/145 |
| 4,484,046 A | * | 11/1984 | Neuhouser ............... 200/144 B |
| 4,527,028 A | * | 7/1985 | Luehring ................. 200/144 B |
| 4,879,441 A | * | 11/1989 | Hamm et al. ........... 200/144 B |
| 6,144,005 A | * | 11/2000 | Tanimizu et al. ............ 218/118 |

FOREIGN PATENT DOCUMENTS

| JP | 48-81068 | 10/1973 | |
| JP | 50-135563 | 10/1975 | .......... H01H/33/66 |
| JP | 55-143727 | 11/1980 | .......... H01H/33/66 |
| JP | 58-145035 | 8/1983 | .......... H01H/33/66 |
| JP | 3-273804 | 12/1991 | .......... H02B/13/02 |
| JP | 9-153320 | 6/1997 | .......... H01H/33/66 |

* cited by examiner

Primary Examiner—Michael Friedhofer
(74) Attorney, Agent, or Firm—Mattingly, Stanger & Malur, P.C.

(57) ABSTRACT

In order to provide a vacuum switch suitable for a distribution and transformation system compatible between structural simplicity and reliability and a vacuum switchgear using the vacuum switch, the vacuum switch comprises switching portions installed in a grounded vacuum container; and a breaker, a grounding switch and an isolator as things having the switching portions, wherein the vacuum container is divided into at least two chambers, and the switching portion of the breaker is disposed in one of the chambers and the switching portions of the grounding switch and the isolator are disposed in the other of the chambers through an insulation body.

24 Claims, 10 Drawing Sheets

SWITCH GEAR, "ON" STATE

SWITCH GEAR, "OFF" STATE

SWITCH GEAR, "ON" STATE

VACUUM SWITCH AND VACUUM SWITCH GEAR USING THE VACUUM SWITCH

FIELD OF THE INVENTION

The present invention relates to a vacuum switch suitable for a distribution and transformation system compatible between structural simplicity and reliability and a vacuum switchgear using the vacuum switch.

BACKGROUND OF THE INVENTION

In regard to increasing demand of power consumption in a congested urban district, there are problems such as difficulty of obtaining a site for a distribution substation, lack of installation room for wire ducts, and requirement for a high operability of a supply facility. In order to solve these problems, it is necessary that the voltage is increased, that is, that load is actively absorbed in a voltage system having a large capacity per line. Increase in distribution voltage relates to forming of an effective electric power supply system. Therefore, it is necessary to make the distribution components and the distribution and transformation facility further compact.

As for the distribution and transformation components to be made compact, there is an $SF_6$ gas insulation switchgear disclosed in, for example, Japanese Patent Application Laid-Open No.3-273804. The switchgear of the patent is formed in such as a breaker, two isolators and a grounding switch individually fabricated are contained in a unit chamber and a bus chamber of power distribution containers filled with an insulation gas.

Further, as a vacuum switchgear disclosed in Japanese Patent Application Laid-Open No.55-143727, there is a switchgear in which a movable electrode is horizontally rotated around a main axis to be brought in and off contact with a fixed electrode. As disclosed in Japanese Patent Application Laid-Open No.9-153320, there is a switchgear in which a movable conductor provided in a single vacuum container is moved on a close position, a open position, an isolation position and a grounding position while being rotated between a fixed conductor and a grounding conductor.

Further, as disclosed in the U.S. Pat. No. 3,814,882, Japanese Patent Application Laid-Open No.50-135563 and Japanese Patent Application Laid-Open No.58-145035, there is a switchgear in which a container formed of an insulating material is divided into two chambers, a movable electrode and a fixed electrode are individually disposed in the two chambers, and one of the chambers is evacuated to a vacuum and the other of the chambers is filled with an insulation gas such as $SF_6$, or both of the chambers are evacuated to a vacuum. Furthermore, as disclosed in Japanese Patent Application Laid-Open No.48-81068, there is a switchgear in which a vacuum container is divided into three chambers.

The $SF_6$ gas insulation switchgear disclosed in Japanese Patent Application Laid-Open No.3-273804, and the switchgear disclosed in the U.S. Pat. No. 3,814,882, Japanese Patent Application Laid-Open No.50-135563 use $SF_6$ gas as the insulation medium. Use of $SF_6$ gas is globally reduced because $SF_6$ gas produces an ill effect on environment (from the viewpoint of prevention of global warming). Therefore, a switchgear not using $SF_6$ gas is required.

The switchgear disclosed in Japanese Patent Application Laid-Open No.55-143727 needs sufficient safety measures in order to perform maintenance and inspection of the distribution and transformation system because the container is not grounded. That is, it is necessary that remaining charge and induced current are conducted to the ground by opening an isolator provided separately from a breaker and grounding a grounding switch after breaking the breaker. Further, since the components are individually disposed, there is a difficulty in making the switchgear small in size.

On the other hand, although the switchgear disclosed in Japanese Patent Application Laid-Open No.9-153320 is better in small size, there is a disadvantage in that all the functions are lost if a failure occurs because the close position, the open position, the isolation position and the grounding position are disposed in the single vacuum container.

Further, the switchgear disclosed in the U.S. Pat. No. 3,814,882, Japanese Patent Application Laid-Open No.50-135563 and Japanese Patent Application Laid-Open No.58-145035 can not be expected to made compact and can work only a single function because the container is made of an insulating material.

SUMMARY OF THE INVENTION

An object of the present invention is to provide a substantially small sized vacuum switch and a switchgear using the vacuum switch. Another object of the present invention is to provide a vacuum switch without using any insulation gas concerning the effect on environment and a switchgear using the vacuum switch. A further object of the present invention is to provide a vacuum switch which does not immediately lose the whole function and can maintain part of the function even if vacuum break occurs in a part of the vacuum switch, and to provide a vacuum switchgear using the vacuum switch. A still further object of the present invention is to provide a vacuum switch which can individually provide only a portion of a breaker, and only portions of a grounding switch and an isolator, and to provide a vacuum switchgear using the vacuum switch.

The present invention is characterized by that a grounded vacuum container is divided into a plurality of vacuum chambers through insulation bodies or a plurality of grounded vacuum containers are connected through insulation bodies, and a movable electrode disposed through an insulation body and driven by an operating mechanism and a fixed electrode disposed through an insulation body and paring with the movable electrode are gas-tightly sealed in each of the vacuum chambers or each of the vacuum containers.

A pair of the movable electrode and the fixed electrode compose the switching portion of any one of the breaker, the grounding switch or the isolator, and one or more of the switching portions may be arranged in one vacuum chamber or one vacuum container. The plurality of vacuum chambers or the plurality of vacuum containers are substantially arranged on a single axis and connected to each other through insulation bodies, and the electrode sealed inside the vacuum chamber or the vacuum container in an end portion in one side out of the plurality of vacuum chambers or the plurality of vacuum containers is electrically connected to a load side conductor, and the electrode sealed inside the vacuum chamber or the vacuum container in an end portion in the other side is electrically connected to a bus side conductor.

The electrical connection between the load side conductor and the electrode, or between the electrodes, or between the electrode and the bus side conductor, for example, the electrical connection between the rotationally moved switching portion of the breaker and the bus side conductor or between the switching portion of the grounding switch and the switching portion of the isolator is performed using a flexible conductor of a flexible member. A bellows may be used as the flexible member.

Therein, the switch means a machine for performing connecting and disconnecting between the fixed electrode and the movable electrode. The switchgear includes a control gear, and means a machine that one or more of the switching machine and one or more devices among an operating, a measuring, a protective and an adjusting devices and inner connections are combined, and these are contained in an enclosed box. Further, the switchgear includes an assembly of machines and devices comprising accessories and supporting structures in addition to the construction described above, and further includes a control unit for controlling the operating mechanism.

The breaker is a switchgear which is used for immediately isolating a position of occurrence of ground-fault or short-circuit in an electric power system from the system to prevent damage of a machine connected in series caused by a large current and to preventing damage of a failed machine by an arc. The isolator is a machine which performs switching of a charged electric path though it does not have breaking ability of a large current, and used for ensuring to isolate from a power supply when the circuit connection is changed or machines are maintained or inspected. There are various kinds of isolators for low voltage to high voltage. The grounding switch is a switching machine for ensuring safety by grounding conductors under a null-voltage condition during inspection and maintenance. The breaker can break all of charged current, normal current, abnormal current. The isolator can break charged current, but can not break both of normal current and abnormal current. The grounding switch can break none of charged current, normal current, abnormal current.

According to the present invention, the vacuum switch and the vacuum switchgear have effects that they are excellent in pollution control measures and they can attain small-sizing. The switchgear having a vacuum container divided into two or more chambers or two or more vacuum containers is highly reliable in the point that one of the chambers or the containers can maintain vacuum when vacuum of the other is broken. Further, since vacuum condition may be formed not only the whole system but also part of the system, for example, only breaker portion, a product type corresponding to a need and an economical product can be formed. Application of the flexible member to the electrical connection, for example, application of the flexible member to the electrical connection between the rotationally moved switching portion of the breaker and the bus side conductor can certainly perform the rotational moving and current conduction of the switching portion and contributes to compactness of the system. Application of the flexible member to the electrical connection between the switching portion of the grounding switch and the switching portion of the isolator contributes to certainty of current conduction and compactness of the system.

BRIEF DESCRIPTION OF DRAWINGS

FIG. 2 shows the construction of a vacuum switchgear for one phase using the vacuum switch of FIG. 1, (A) is a cross-sectional side view showing the vacuum switchgear in a state of the breaker "ON", the grounding switch "OFF" and the isolator "ON", and (B) is a partially cross-sectional top plan view showing the vacuum switchgear in the same state.

FIG. 3 shows the construction of a vacuum switchgear for one phase using the vacuum switch of FIG. 1, (A) is a cross-sectional side view showing the vacuum switchgear in a state of the breaker "OFF", the grounding switch "OFF" and the isolator "ON", and (B) is a partially cross-sectional top plan view showing the vacuum switchgear in the same state.

FIG. 4 shows the construction of a vacuum switchgear for one phase using the vacuum switch of FIG. 1, (A) is a cross-sectional side view showing the vacuum switchgear in a state of the breaker "OFF", the grounding switch "ON" and the isolator "OFF", and (B) is a partially cross-sectional top plan view showing the vacuum switchgear in the same state.

FIG. 5 shows the construction of a vacuum switchgear for three phases using the vacuum switch of FIG. 1 together with a containing cubicle, an operation compartment, a protective control unit and so on, (A) is a cross-sectional side view showing the vacuum switchgear in a state of the breaker "ON", the grounding switch "OFF" and the isolator "ON", and (B) is a top plan view showing the vacuum switchgear in the same state, and (C) is a bottom view showing the vacuum switchgear in the same state.

FIG. 7 shows the construction of a vacuum switchgear for one phase using a second embodiment of a vacuum switch in accordance with the present invention, (A) is a cross-sectional side view showing the vacuum switchgear in a state of the breaker "ON", the grounding switch "OFF" and the isolator "ON", and (B) is a partially cross-sectional top plan view showing the vacuum switchgear in the same state.

FIG. 8 shows the construction of a vacuum switchgear for one phase using a third embodiment of a vacuum switch in accordance with the present invention, (A) is a cross-sectional side view showing the vacuum switchgear in a state of the breaker "ON", the grounding switch "OFF" and the isolator "ON", and (B) is a partially cross-sectional top plan view showing the vacuum switchgear in the same state.

FIG. 9 shows the construction of a vacuum switchgear for one phase using a fourth embodiment of a vacuum switch in accordance with the present invention, (A) is a cross-sectional side view showing the vacuum switchgear in a state of the breaker "ON", the grounding switch "OFF" and the isolator "ON", and (B) is a partially cross-sectional top plan view showing the vacuum switchgear in the same state.

FIG. 10 shows the construction of a vacuum switchgear for one phase using a fifth embodiment of a vacuum switch in accordance with the present invention, (A) is a cross-sectional side view showing the vacuum switchgear in a state of the breaker "ON", the grounding switch "OFF" and the isolator "ON", and (B) is a partially cross-sectional top plan view showing the vacuum switchgear in the same state.

DESCRIPTION OF THE PREFERRED EMBODIMENTS (Embodiment 1)

Figure 1:
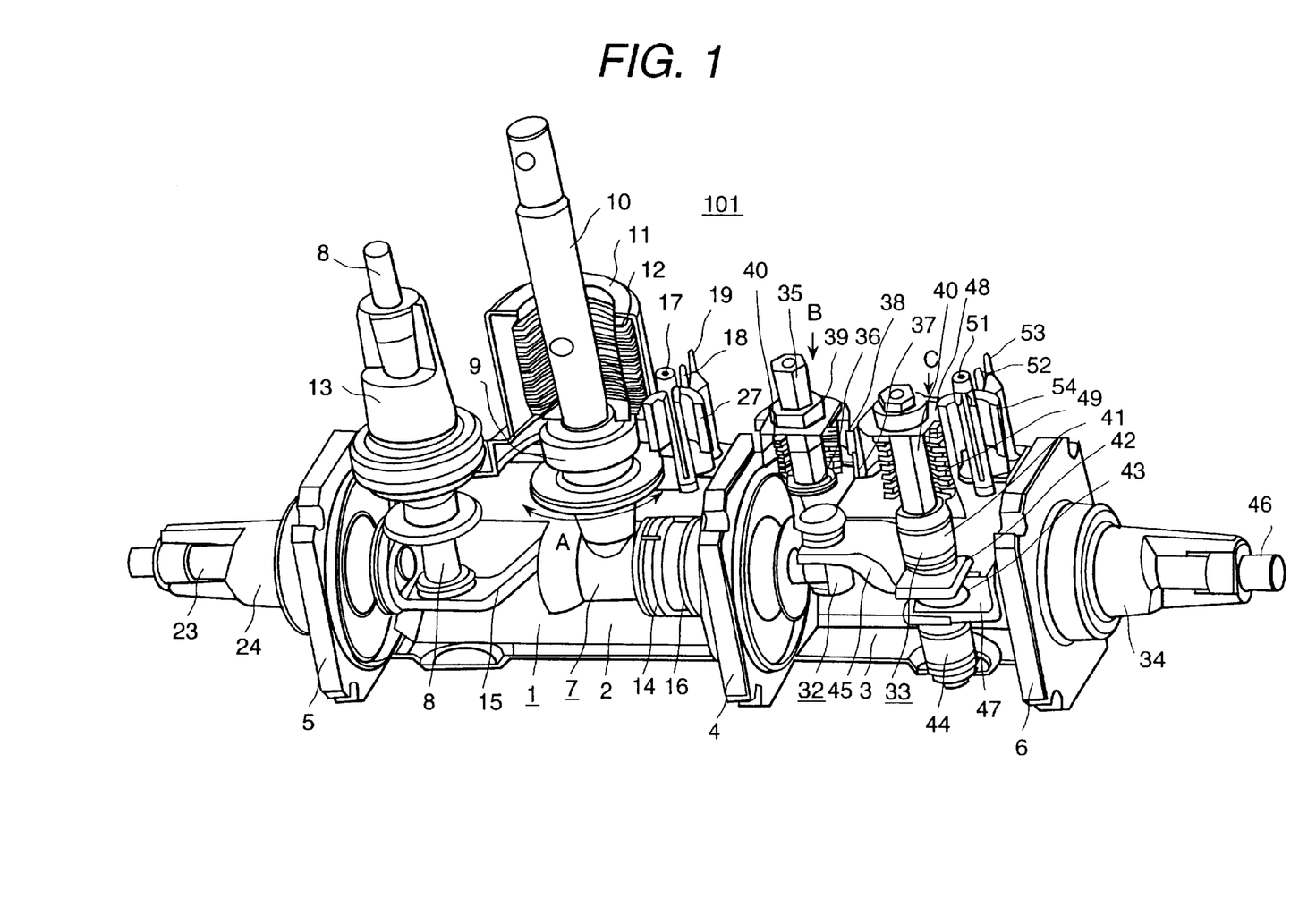
FIG. 1 is a perspective view showing the construction of a first embodiment of a vacuum switch in accordance with the present invention.

FIG. 1 shows the construction of a first embodiment of a vacuum switch in accordance with the present invention, and FIG. 2 to FIG. 6 show the construction of a vacuum switchgear using the vacuum switch(or switches). For the purpose of simplifying description, the bus portions and the end portions such as the feeder side, the covers and the plugs are omitted in FIG. 1. Further, in FIG. 2 to FIG. 4, the operation compartment and the protective control unit are omitted, and the machine construction only for one phase is shown.

In the present embodiment, the grounded vacuum container 1 is partitioned into a first vacuum chamber 2 and a second vacuum chamber 3 with a partition wall 4. The partition wall 4 is made of a ceramic of electric insulator. The first vacuum chamber 2 and the second vacuum chamber 3 are substantially arranged on a single axis, and is formed in a gas-tight structure with a casing, not shown, of the vacuum container 1, the partition wall 4 and flange portions 5, 6 of the bushings so that vacuum of each of the vacuum chambers is maintained to $10^{-6}$ to $10^{-9}$ torr. That is, the flange portions 5, 6 also serve as end walls of the vacuum container 1 to form these walls. The flange portions 5, 6 are made of a ceramic of electric insulator similar to the partition wall 4.

Inside the first vacuum chamber 2, a breaker 7 and a main circuit conductor 8 are disposed, and each of them is formed so as to project upward from the casing portion of the first vacuum chamber 2. An operating rod 10 extends upward from the breaker 7 through an insulating body 9 made of a ceramic. A gas-tight structure is formed between the insulating body 9 and the casing of the first vacuum chamber 2 with an end portion cover 11 and a bellows 12 of a flexible member. A bushing 13 made of a ceramic is formed in the upper portion of the main circuit conductor 8.

A movable side electrode 14 is provided in a side opposite to the operating rod 10 of the insulation body 9, and one end of the movable side electrode 14 is electrically connected to the main circuit conductor 8 through a flexible conductor 15. The flexible conductor 15 is mechanically fastened to a lower end of the main circuit conductor 8 using a screw or the like. A fixed side electrode 16 is arranged opposite to the other end side of the movable side electrode 12, and the switching portion (breaking portion) of the breaker 7 is formed by the pair of the movable side electrode 14 and the fixed side electrode 16.

Figure 2:
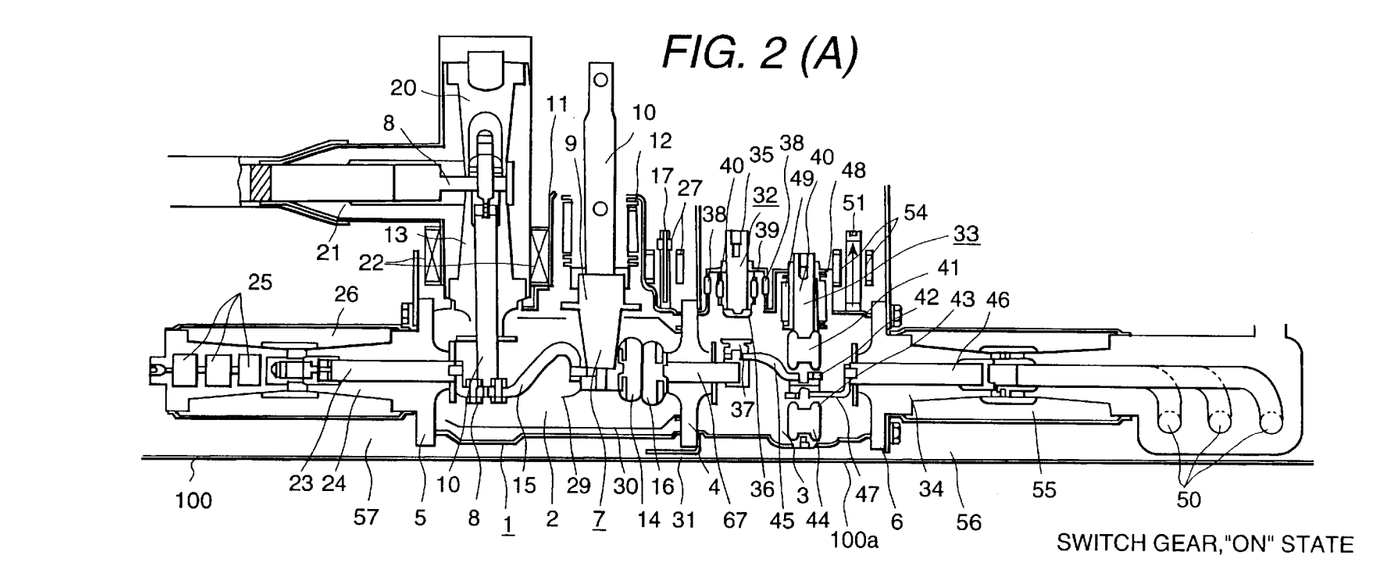
Figure 3:
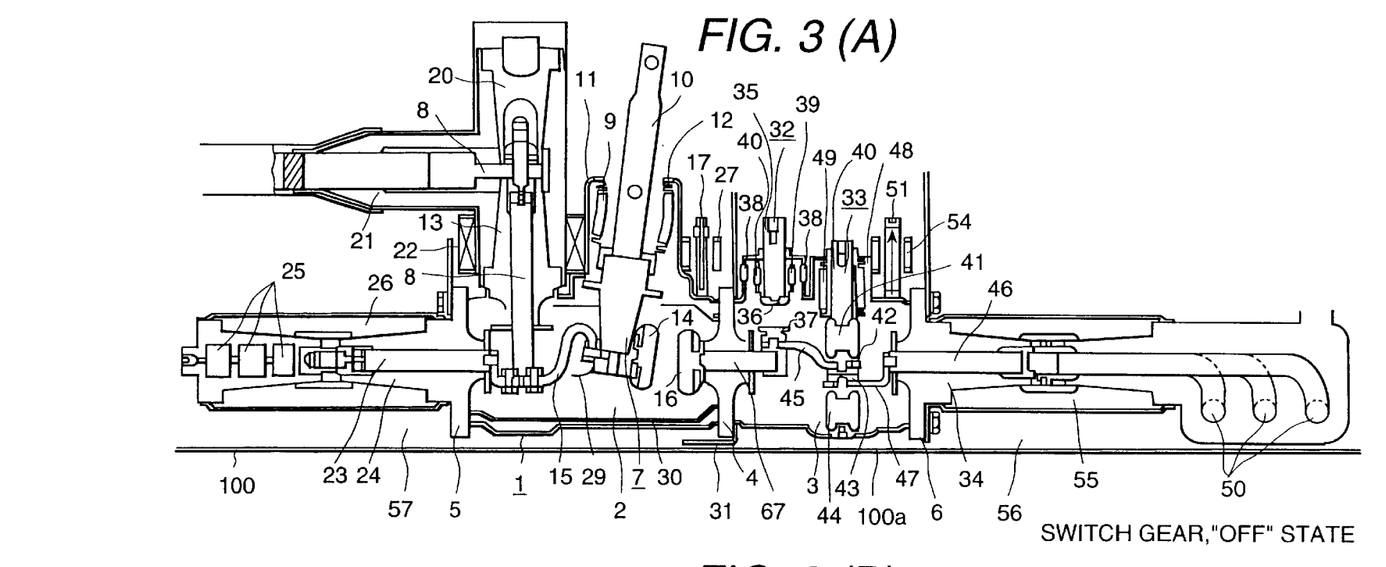

An arrow A in the figure indicates an operating direction of the operating rod 10, and according to this motion the state of breaker "ON" shown in FIG. 2, that is, the conduction state that the movable side electrode 14 is in contact with the fixed side electrode 16, or the state of breaker "OFF" shown in FIG. 3, that is, the state that the operating rod 10 is slanted and the movable side electrode 14 is out of contact with the fixed side electrode 16 is formed.

A vacuum gauge 17, a gas absorption column 18 (also called as a getter) and an evacuation pipe, that is, an exhaust gas pipe 19 for recovery are installed on the top surface of casing of the first vacuum chamber 2. A magnet 27 is arranged around the vacuum gauge 17 in a ring-shape. The operating rod 10 is operated when a fault current flows or when an OFF command is output from an operation machine (when the breaker is intentionally broken for the purpose of maintenance or inspection).

An insulating plug 20 is arranged further above the bushing 13. The main circuit conductor 8 is bent at a position before the plug 20 and led to an main circuit (a load). The outer portion of the main circuit conductor 8 from the bent portion toward the leading direction of the bus is covered with rubber 21 for insulation. A current transformer 22 is arranged around the bushing 13. The current transformer 22 detects a current flowing the main circuit so that the breaker is immediately broken when an abnormal current flows.

A voltage detection conductor 23 is electrically connected to a top end of the flexible conductor 15. The voltage detection conductor 23 is covered with a bushing 24 made of a ceramic having an electric insulating property. Capacitors 25, three capacitors arranged in series in this embodiment, covered with epoxy resin are disposed at a top end of the voltage detection conductor 23. A further outer side of the busing 24 and the capacitors 25 covered with epoxy resin are covered with insulation rubber 26.

An arc preventive cover 29 is disposed at a position near the breaker 7 side connection portion of the flexible conductor 15. Further, an arc preventive cover 30 is also disposed in a semi-cylindrical shape around the preventive cover 29 so as to cover most part of a lower inner wall of the casing. The partition wall 4 is attached to the inner wall of the casing 100a of the containing cubicle 100 with an attaching clamp 31.

In the second vacuum chamber 3, the grounding switch 32, the isolator 33 and the vacuum container end portion wall (the flange portion 6) are sequentially arranged from the partition wall 4 side. The busing 34 made of a ceramic is arranged in the outer side of the end portion of the vacuum container end portion wall (the flange portion 6). The grounding switch 32 and the isolator 33 project upward from the casing of the second vacuum chamber 3.

The grounding switch 32 has a rod-shaped conductor 35 the top end of which an operating rod is linked to, and movable in a direction shown by an arrow B, that is, vertically movable, and a movable side electrode 36 is formed in the lower end of the portion. A fixed side electrode 37 is arranged at a position below the movable side electrode 36. The fixed side electrode 37 and the fixed side electrode 16 of the breaker 7 are electrically connected each other with an electric connecting portion 67 penetrating through the partition wall 4. A gas-tight structure is formed between the casing of the second vacuum chamber 3 and the conductor 35 with a end portion cover 39 having an insulation body 38 made of a ceramic and a bellows 40 of a flexible member.

An insulation body 38 is for insulating current not to flow to the vacuum container when withstanding voltage of the cable is inspected by flowing current from the grounding side. The grounding switch 32 vertically moves the conductor 35 as shown by the arrow B to perform grounding by making between the fixed side electrode 37 and the movable side electrode 36 and to release grounding by breaking between them. The concept is that the grounding switch 32 includes the fixing side electrode 37.

The isolator 33 also has a rod-shaped conductor 40 movable in a direction shown by an arrow C, that is, vertically. An operating rod, not shown, is linked to the top end of the conductor 40. A movable side electrode 42 is formed in the lower end of the conductor 40 through an insulating body 41. A fixed side electrode 43 is arranged opposite to and below the movable side electrode 42. The fixed side electrode 43 is fixed to the inner wall of the second chamber through an insulating body 44 made of a ceramic.

A gas-tight structure is formed between the casing of the second chamber 3 and the conductor 40 with an end cover 48 and a bellows 49 of a flexible member. The fixed side electrode 37 of the grounding switch 32 and the movable side electrode 42 of the isolator 33 are electrically connected to each other with a flexible conductor 45 of a flexible member. The fixed side electrode 43 is connected to a main circuit conductor 46 with an electric connecting portion 47, and a main circuit conductor 50 (bus) is electrically connected to the main circuit conductor 46.

Figure 4:
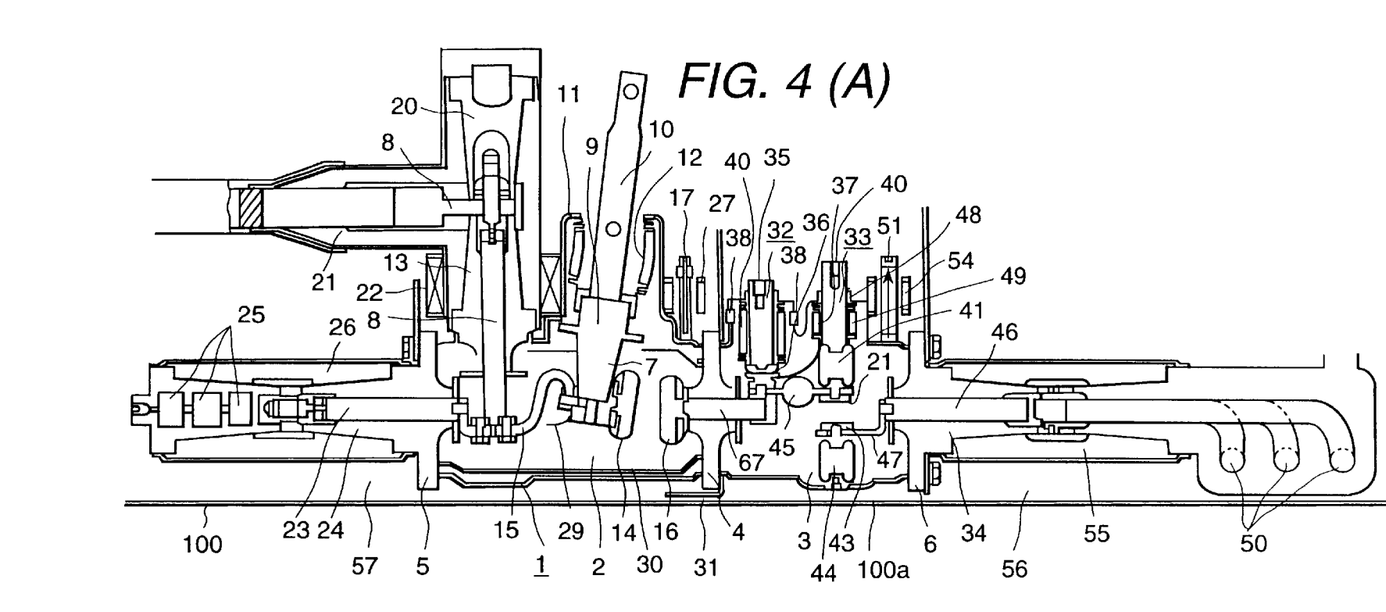

Explaining a series of the conducting relationship referring to FIG. 4, the state of FIG. 4 is a state of breaker "OFF" since the movable side electrode 14 of the breaker is out of contact with the fixed side electrode 16. The movable side of the breaker 7 is in a state of being connected to the main circuit conductor 8 and the voltage detecting conductor 23 through the flexible conductor 15. The grounding switch 32 is in the grounding state since the movable side electrode 36 is in contact with the fixed side electrode 37. The isolator 33 is in the breaking state since the movable side electrode 42 and the fixed side electrode 43 are apart from each other in a distance sufficient enough to break the circuit. The fixed side electrode 43 is led to the bus, as described above.

A vacuum gauge 51 for measuring a vacuum degree of the chamber, a gas absorbing column 52 (also called as a getter) for removing impurities inside the chamber and an evacuation pipe, that is, an exhaust gas pipe 53 for recovery are installed on the top surface of casing of the second vacuum chamber 3. A magnet 54 is arranged in a ring shape around the vacuum gauge 51. An insulating measure is performed be arranging rubber 55 around the bushing 34. The reference characters 56, 57 indicate air, that is, outer air communicating portions.

The bushing 24 and the bushing 34 are fixed with screws to the end portions of the casing of the vacuum container 1 using the flange portions 5, 6, respectively. The both bushings are the same in dimensions and shape and in material, that is, common parts. Further, the shape and dimensions of the top end (a portion excluding the portion corresponding to the flange position) of the bushing 13 is the same as those of the bushings 24, 34. The commonality of parts described above results cost reduction. Thereby, arrangement of the bus portion, the feeder portion and the voltage detecting portion can change depending on a customer's need.

The vacuum gauges 17, 51 utilize the magnetron principle. Therefore, the magnets 27, 54 are arranged in a pipe shape to form a magnetic field at measuring a vacuum degree. However, the vacuum chambers 2, 3 are manufactured so gas-tight as to maintain the vacuum degree for 20 years or longer under a normal using condition. Switching operation of each of the breaker 7, the grounding switch 32 and the isolator 33 is performed by a different operating machine.

In a case where there are two vacuum chambers as in this embodiment, since one of the vacuum chamber maintains vacuum even if vacuum break occurs in the other of the chambers, the system does not immediately lose the whole function. Further, in regard to distribution of products, it is effective that the unit of the first vacuum chamber 2 and the unit of the second vacuum chamber 3 are separately manufactured and installed, or one of them replaces a corresponding existing part, or the both are assembled and joined in place.

The system of the present embodiment is assembled in a vacuum, that is, soldering work is performed to obtain a product by inserting parts temporarily assembled outside into a furnace and heating up them in a vacuum to melt solder and bond appropriate positions together. All bonding between the ceramic body and the vacuum container is performed by soldering, and the plates composing the flexible conductors 15, 45 to be described below are also bonded together through soldering.

In the system of the present embodiment, the flexible conductors 15, 45 are employed. By doing so, conduction of current can be certainly performed during operation, and the structure can be simplified because current can be certainly conducted during rotating motion and during vertical motion. If the flexible conductors 15, 45 are installed outside the vacuum container, current flows in the flexible conductors 15, 45 and it is dangerous unless the portions outside the vacuum container are insulated by covering with $SF_6$ gas or a solid insulator. Therefore, by installing the flexible conductors 15, 45 in the vacuum container, safety can be ensured, and the system can be made compact. It is preferable that the current conducting area of the flexible conductor 15 or 45 is at least 200 $mm^2$, and the necessary current capacity is a strength capable of withstanding 25 kA for 1 second.

In the present embodiment, the lower portion of the main circuit conductor 8 and the voltage detecting conductor 23 are electrically connected each other with the flexible conductor 15. This is effective use of an extra portion of the flexible conductor 15 extending from the breaker 7 of which the middle portion is fixed to the main circuit conductor 8. Therefore, there is no need to use a flexible conductor in connection between the voltage detecting conductor 23 and the main circuit conductor 8. This is because the both are in a fixed positional relation, and accordingly there is no necessity to be flexible. Similarly, the electric connecting portion 47 is not necessary to be a flexible conductor.

Figure 11:
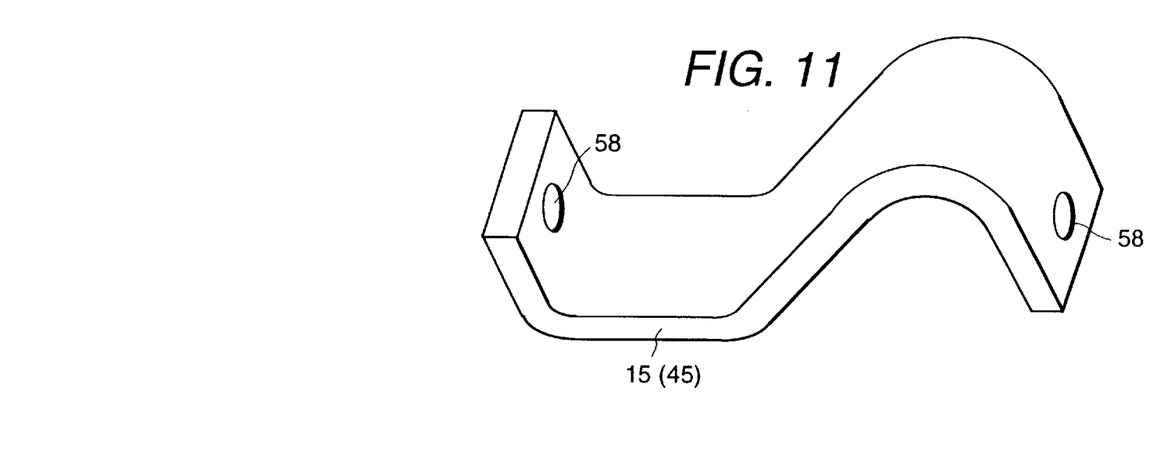
FIG. 11 is a perspective view showing the outer appearance of a flexible conductor used in the systems of FIG. 1 to FIG. 10.

FIG. 11 shows the outer appearance of the flexible conductor. The flexible conductor 15 or 45 related to the present embodiment is formed by laminating a plurality of oxygen-free copper plates, interposing a solder material between the plates each, and soldering the both ends as shown in FIG. 11. The soldered portions 58 are also used as attaching portions to the electrodes or the conductors. The flexible conductor 15 is composed of 70 plates of 120 to 130 mm length, 30 mm width and 0.1 mm thickness. The flexible conductor 45 is composed of 50 plates of 60 to 70 mm length, 30 mm width and 0.1 mm thickness, that is, the length of the conductor 15 following to rotating movement is longer.

In the present embodiment, description has been made on the vacuum switch which is composed of the vacuum container divided into two chambers, the breaker having the switching portion gas-tightly sealed in one of the vacuum chamber, and the isolator and the grounding switch having the switching portions gas-tightly sealed in the other of the vacuum chamber. It may be possible to consider a vacuum switch which is composed of a vacuum container and a breaker having the switching portion gas-tightly sealed in the vacuum container, or a vacuum switch which is composed of a vacuum container and an isolator and a grounding switch having the switching portions gas-tightly sealed in the vacuum container. In these cases, similar to the above-mentioned embodiment, the flexible members similar to those in the above-mentioned embodiment are used in electric connection between the main circuit and the switching portion or electric connection between the switching portions.

Figure 5:
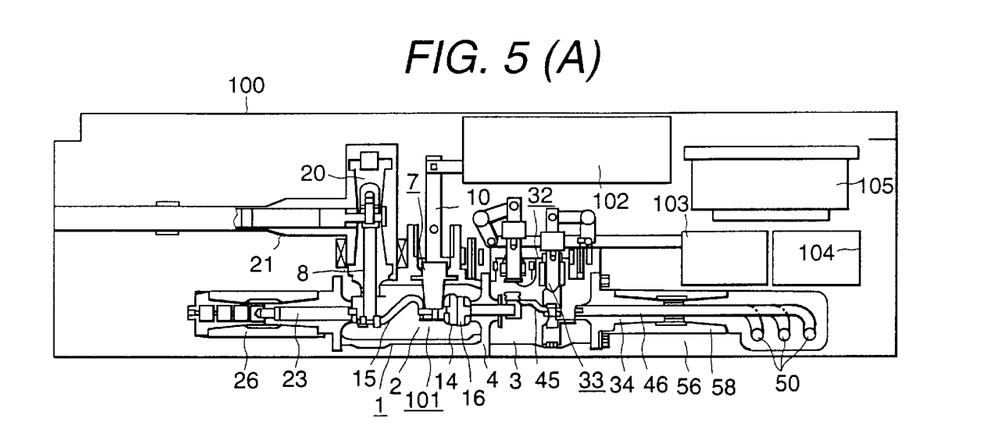
Figure 6:
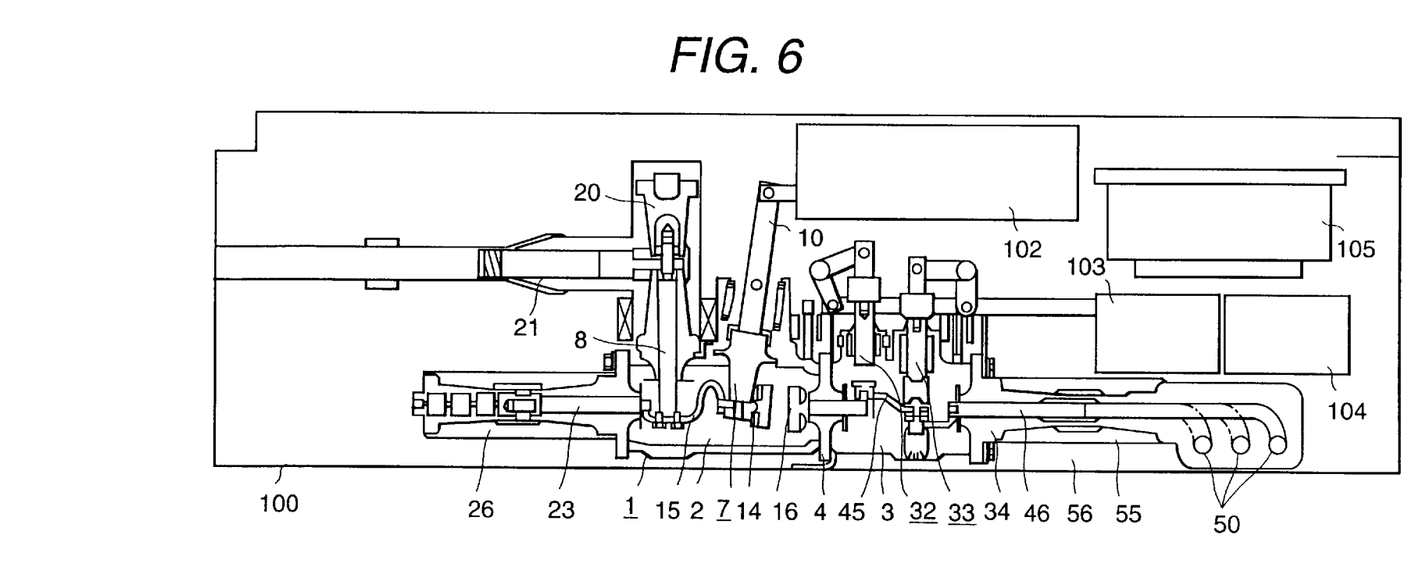
FIG. 6 a cross-sectional side view showing the construction of a vacuum switchgear for three phases using the vacuum switch of FIG. 1 together with a containing cubicle, an operation compartment, a protective control unit and so on, the vacuum switchgear being in a state of the breaker "OFF", the grounding switch "OFF" and the isolator "ON".

The overall structure of an embodiment of a vacuum switchgear will be described below, referring to FIG. 5 and FIG. 6. Referring to the figures, the reference character 100 is a metallic containing cubicle. The vacuum switches 101 for three phases of U, V, W are contained in the containing cubicle 100. Each of the vacuum switches 101 for three phases is the same structure as the vacuum switch of the above-mentioned embodiment, and comprises the breaker 7 having the breaking function, the grounding switch 32 having grounding function and the isolator 33 having the isolating function. A main circuit conductor (bus) 50 is electrically connected to one end of each of the vacuum switches 101, and a main circuit conductor 8 is electrically connected to the other end of each of the vacuum switches 101.

The containing cubicle 100 contains operating compartments 102, 103, 104 respectively containing operating mechanisms for the breakers 7, the grounding switchs 32 and the isolators 33 and a protective control unit 105 for outputting control commands to each of the operating mechanisms. The operating mechanisms are constructed so as to operate the breakers 7, the grounding switches 32 and the isolators 33 three phases together, respectively. The operating compartments 102, 103, 104 and the protective control unit 105 are arranged in a space above the main circuit conductors 50 of the vacuum switches 101.

As described above, the vacuum switchgear is composed of the containing cubicle 100, the vacuum switches 101 for three phases, the main circuit conductors 8, 50, the operating compartments 102, 103, 104 and the protective control unit 105.

(Embodiment 2)

Figure 7:
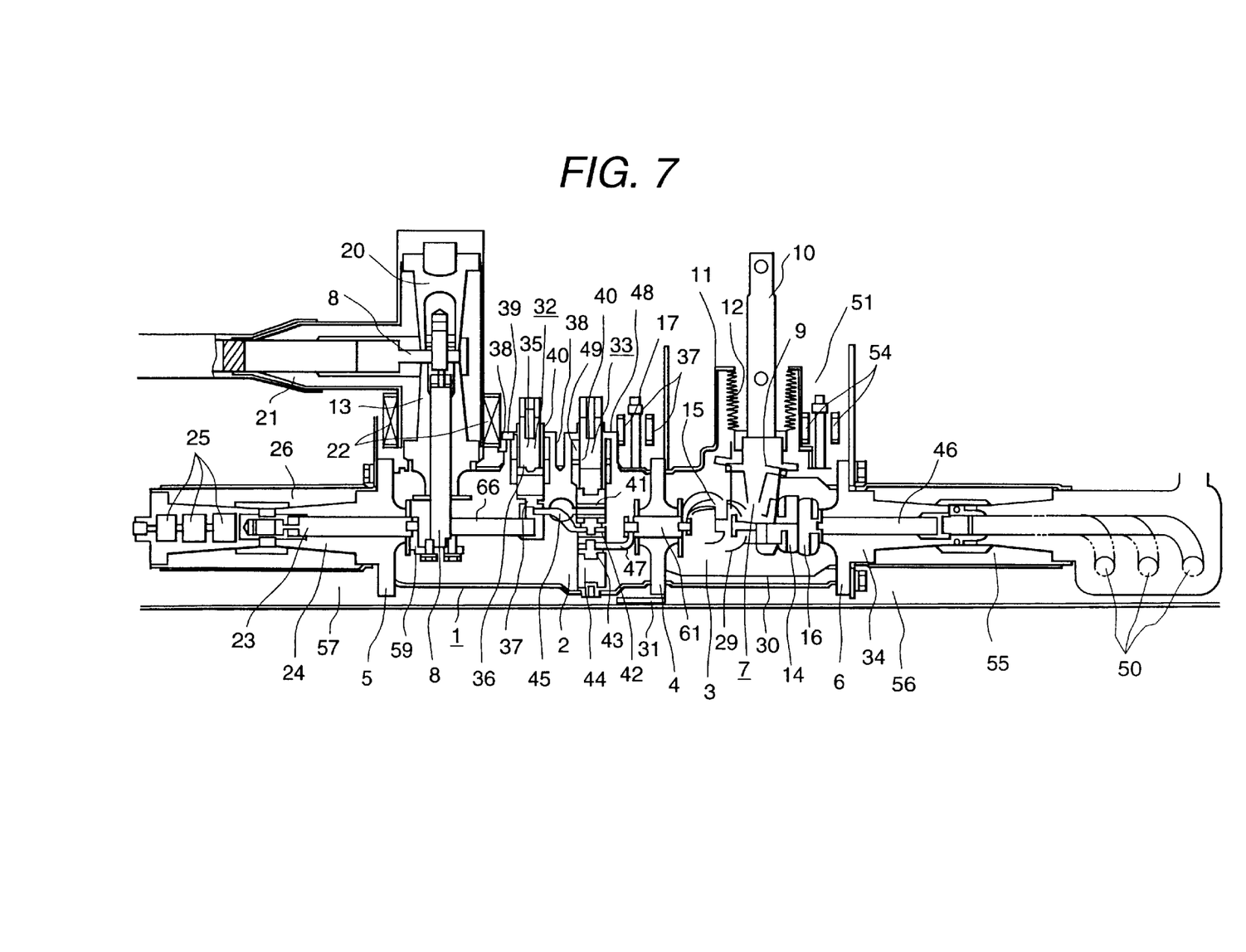

FIG. 7 shows the construction of a vacuum switchgear using a second embodiment of a vacuum switch. For the purpose of simplifying description, in the figure, the operation compartment and the protective control unit are omitted, and the machine construction only for one phase is shown. In this embodiment, the grounding switch 32, the isolator 33 and the main circuit conductor 8 are arranged in the first vacuum chamber 2, and the breaker 7 is arranged in the second vacuum chamber 3.

In the first vacuum chamber 2, the fixed side electrode 37 of the grounding switch 32 is electrically connected to an electric connection portion 66 extending in the longitudinal direction from the main circuit conductor 8. The movable side electrode 36 is arranged opposite to the fixed side electrode 37. The movable side electrode 42 of the isolator 33 is electrically connected to the fixed side electrode 37 of the grounding switch 32 through the flexible conductor 45. An electric connection portion 67 is electrically connected to the fixed side electrode 43 arranged opposite to the movable side electrode 42 through an electric connection portion 47.

In the second vacuum chamber 3, the fixed side electrode 16 of the breaker 7 is electrically connected to the main circuit conductor 46. An electric connection portion 67 is electrically connected to the movable side electrode 14 arranged opposite to the fixed side electrode 16 through the flexible conductor 15. Since the other structure is the same as that of the embodiment described above, the description is omitted here.

In the present embodiment, there are two vacuum chambers. Therefore, since one of the vacuum chamber maintains vacuum even if vacuum break occurs in the other of the chambers, the system does not immediately lose the whole function. Further, in regard to distribution of products, it is effective that the unit of the first vacuum chamber 2 and the unit of the second vacuum chamber 3 are separately manufactured and installed, or one of them replaces a corresponding existing part, or the both are assembled and joined in place.

(Embodiment 3)

Figure 8:
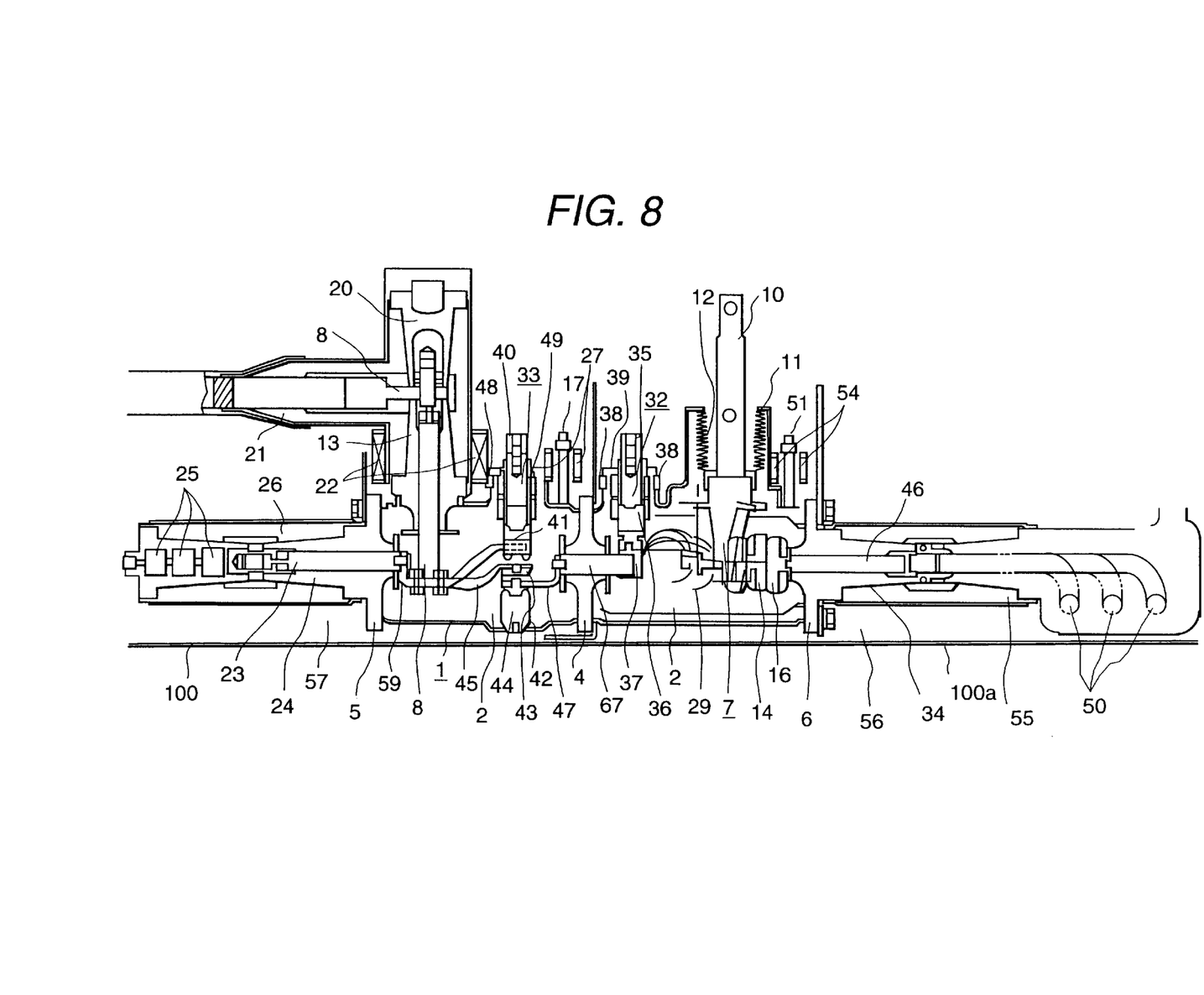

FIG. 8 shows the construction of a vacuum switchgear using a third embodiment of a vacuum switch. For the purpose of simplifying description, in the figure, the operation compartment and the protective control unit are omitted, and the machine construction only for one phase is shown. In this embodiment, the isolator 33 and the main circuit conductor 8 are arranged in the first vacuum chamber 2, and the breaker 7 and the grounding switch 32 are arranged in the second vacuum chamber 3.

In the first vacuum chamber 2, the movable side electrode 42 of the isolator 33 is electrically connected to the main circuit conductor 8 through the flexible conductor 45. An electric connection portion 67 is electrically connected to the fixed side electrode 43 arranged opposite to the movable side electrode 42 through an electric connection portion 47.

In the second vacuum chamber 3, the fixed side electrode 16 of the breaker 7 is electrically connected to the main circuit conductor 46. The fixed side electrode 37 of the grounding switch 32 is electrically connected to the movable side electrode 14 arranged opposite to the fixed side electrode 16 through the flexible conductor 15. An electric connection portion 67 is electrically connected to the fixed side electrode 37 of the grounding switch 32. The movable side electrode 36 is arranged above and opposite to the fixed side electrode 37. Since the other structure is the same as that of the embodiment described above, the description is omitted here.

In the present embodiment, there are also two vacuum chambers. Therefore, since one of the vacuum chamber maintains vacuum even if vacuum break occurs in the other of the chambers, the system does not immediately lose the whole function. Further, in regard to distribution of products, it is effective that the unit of the first vacuum chamber 2 and the unit of the second vacuum chamber 3 are separately manufactured and installed, or one of them replaces a corresponding existing part, or the both are assembled and joined in place.

(Embodiment 4)

Figure 9:
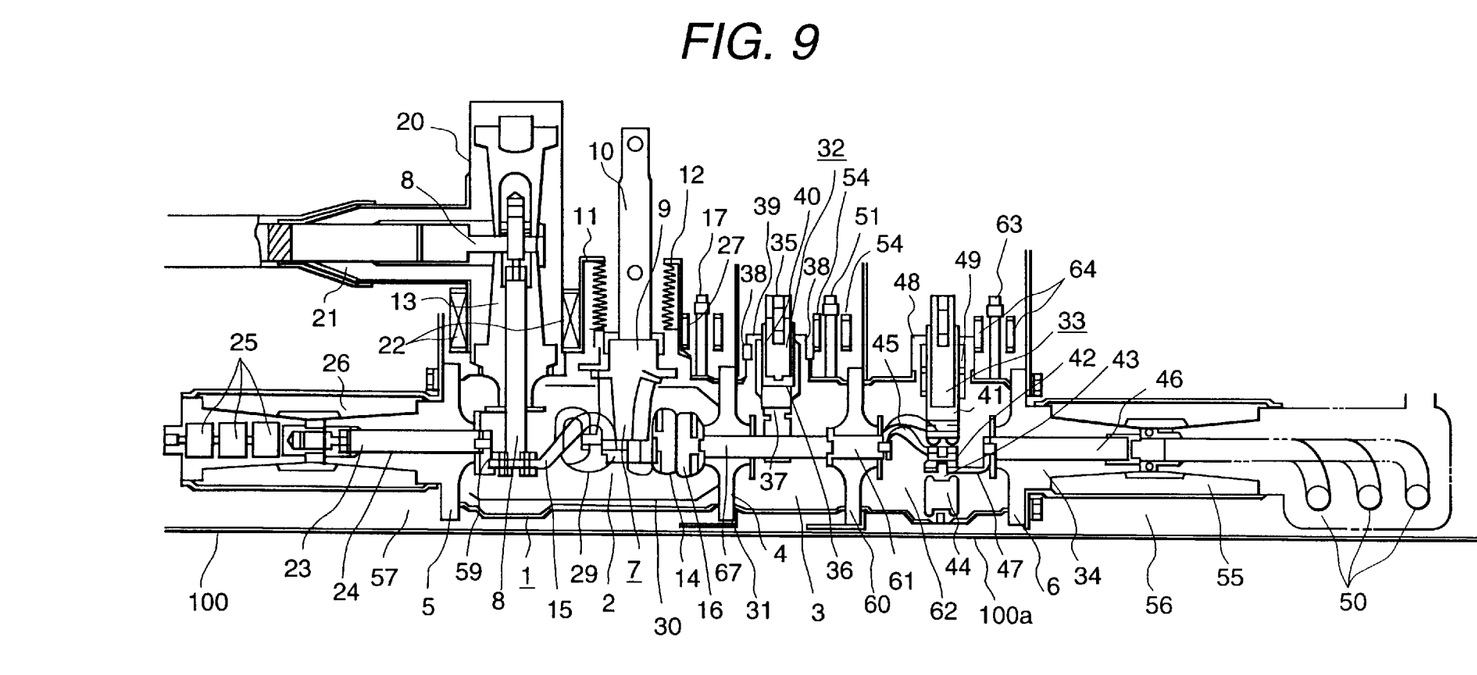

FIG. 9 shows the construction of a vacuum switchgear using a fourth embodiment of a vacuum switch. For the purpose of simplifying description, in the figure, the operation compartment and the protective control unit are omitted, and the machine construction only for one phase is shown. In this embodiment, the vacuum container 1 is partitioned into a first vacuum chamber 2, a second vacuum chamber 3 and a third vacuum chamber 62 with partition walls 4, 60. The partition wall 60 is made of a ceramic and electric insulator, similar to the partition wall 4. The third vacuum chamber 62 is also maintained in a vacuum of $10^{-6}$ to $10^{-9}$ torr, similar to the first vacuum chamber 2 and the second vacuum chamber 3. The breaker 7 and the main circuit conductor 8 are arranged in the first vacuum chamber 2, and the grounding switch 32 is arranged in the second vacuum chamber 3, and the isolator 33 is arranged in the third vacuum chamber 62.

In the first vacuum chamber 2, the electric connection portion 67 is electrically connected to the fixed side electrode 16 of the breaker 7. The main circuit conductor 8 is electrically connected to the movable side electrode 14 arranged opposite to the fixed side electrode 16 through the flexible conductor 15.

In the second vacuum chamber 3, the electric connection portion 67 is electrically connected to the fixed side electrode 37 of the grounding switch 32. The movable side electrode 36 is arranged above and opposite to the fixed side electrode 37. The electric connection portion 67 extending in the longitudinal direction is electrically connected to an electric connection portion 61 fixed on the partition wall 60.

In the third vacuum chamber 62, the main circuit conductor 46 is electrically connected to the fixed side electrode 43 of the isolator 33 through the electric connection portion 47. The electric connection portion 61 is electrically connected to the movable side electrode 42 arranged opposite to the fixed side electrode 43 through the flexible conductor 45.

A vacuum gauge 63, a gas absorbing column and an exhaust gas pipe are arranged on the top surface of the casing of the third vacuum chamber 62, similarly to the first vacuum chamber 2 and the second vacuum chamber 3. A magnet 64 is arranged around the vacuum gauge 63 in a ring shape to form a magnetic field at measuring the vacuum degree. Since the other structure is the same as that of the embodiment described above, the description is omitted here.

In the present embodiment, there are also plural vacuum chambers. Therefore, since one of the vacuum chamber maintains vacuum even if vacuum break occurs in the other of the chambers, the system does not immediately lose the whole function. Further, in regard to distribution of products, it is effective that the unit of the first vacuum chamber 2, the unit of the second vacuum chamber 3 and the unit of the third vacuum chamber 62 are separately manufactured and installed, or one of them replaces a corresponding existing part, or the units are assembled and joined in place.

(Embodiment 5)

Figure 10:
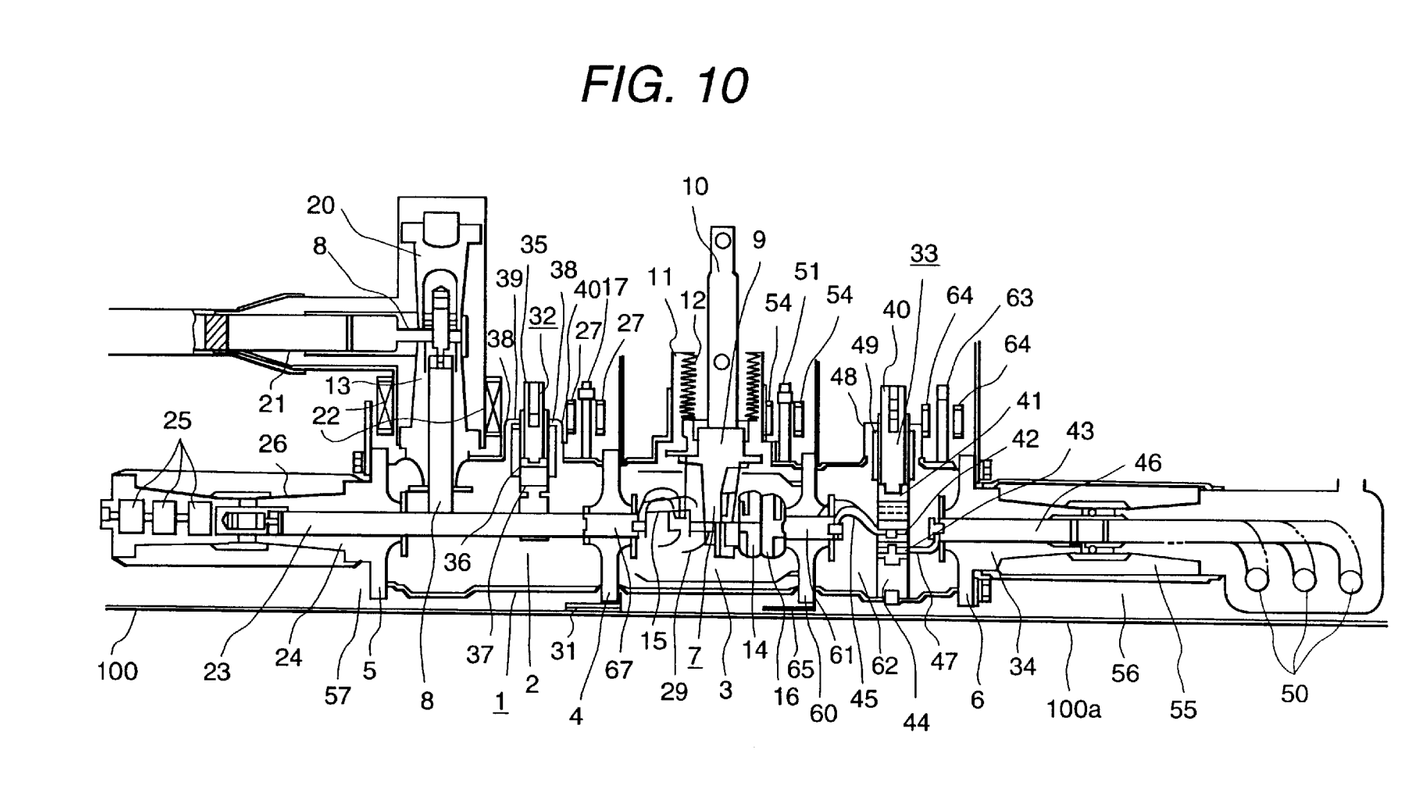

FIG. 10 shows the construction of a vacuum switchgear using a fifth embodiment of a vacuum switch. For the purpose of simplifying description, in the figure, the operation compartment and the protective control unit are omitted, and the machine construction only for one phase is shown. In this embodiment, the vacuum container 1 is partitioned into a first vacuum chamber 2, a second vacuum chamber 3 and a third vacuum chamber 62, similarly to the above embodiment. The grounding switch 32 and the main circuit conductor 8 are arranged in the first vacuum chamber 2, and the breaker 7 is arranged in the second vacuum chamber 3, and the isolator 33 is arranged in the third vacuum chamber 62.

In the first vacuum chamber 2, the voltage detection conductor 23 extending in the longitudinal direction is electrically connected to the electric connection portion 67. The main circuit conductor 8 and the fixed side electrode 37 of the grounding switch 32 are electrically connected to a middle portion of the voltage detection conductor 23. The movable side electrode 36 is arranged above and opposite to the fixed side electrode 37.

In the second vacuum chamber 3, the electric connection portion 61 is electrically connected to the fixed side electrode 16 of the breaker 7. The electric connection portion 67 is electrically connected to the movable side electrode 14 arranged opposite to the fixed side electrode 16 through the flexible conductor 15.

In the third vacuum chamber 62, the main circuit conductor 46 is electrically connected to the fixed side electrode 43 of the isolator 33 through the electric connection portion 47. The electric connection portion 61 is electrically connected to the movable side electrode 42 arranged opposite to the fixed side electrode 43 through the flexible conductor 45. Since the other structure is the same as that of the embodiment described above, the description is omitted here.

In the present embodiment, there are also plural vacuum chambers. Therefore, since one of the vacuum chamber maintains vacuum even if vacuum break occurs in the other of the chambers, the system does not immediately lose the whole function. Further, in regard to distribution of products, it is effective that the unit of the first vacuum chamber 2, the unit of the second vacuum chamber 3 and the unit of the third vacuum chamber 62 are separately manufactured and installed, or one of them replaces a corresponding existing part, or the units are assembled and joined in place.

INDUSTRIAL APPLICATION OF THE INVENTION

The vacuum switch of the present invention and the vacuum switchgear using the vacuum switch can be made substantially small in size without using any insulation gas concerning the effect on environment, and do not immediately lose the whole function even if a part of the function is lost, and to provide a vacuum switchgear using the vacuum switch. Therefore, the vacuum switch and the vacuum switchgear using the vacuum switch are suitable for a distribution and transformation system compatible between structural simplicity and reliability.

What is claimed is:

1. A vacuum switch comprising a vacuum container which is grounded and divided into a plurality of vacuum chambers through insulation bodies; a movable electrode which is gas-tightly sealed in each of said vacuum chambers, and disposed through one of said insulation bodies, and driven by an operating mechanism; and a fixed electrode pairing with said movable electrode which is gas-tightly sealed in each of said vacuum chambers, and disposed through another of the insulation bodies.

2. A vacuum switch according to claim 1, wherein a plurality of pairs of the movable electrode and the fixed electrode are disposed in the one vacuum container.

3. A vacuum switch according to claim 2, wherein one of the fixed and movable electrodes disposed in one of the vacuum chambers in one end side portion of said vacuum container is electrically connected to a load side conductor, and an other of the fixed and movable electrodes disposed in the one vacuum chamber in an other end side portion of said vacuum container is electrically connected to a bus side conductor.

4. A vacuum switchgear comprising a vacuum switch according to claim 2, an operation compartment containing the operating mechanism for driving said movable electrode; a control unit for controlling said operating mechanism; and a metallic container for containing said vacuum switch, said operation compartment and said control unit.

5. A vacuum switch according to claim 1, wherein one of the fixed and moveable electrodes disposed in one of the vacuum chambers in one end side portion of said vacuum container is electrically connected to a load side conductor, and an other of the fixed and moveable electrodes disposed in the one vacuum chamber in an other end side portion of said vacuum container is electrically connected to a bus side conductor.

6. A vacuum switch according to claim 5, wherein the electrical connection between the load side conductor and the other of said fixed and movable electrodes, or between the fixed and movable electrodes, or between the one of said fixed and movable electrodes and the bus side conductor is performed using a flexible conductor.

7. A vacuum switchgear comprising a vacuum switch according to claim 6, an operation compartment containing the operating mechanism for driving said movable electrode; a control unit for controlling said operating mechanism; and a metallic container for containing said vacuum switch, said operation compartment and said control unit.

8. A vacuum switchgear comprising a vacuum switch according to claim 5, an operation compartment containing the operating mechanism for driving said movable electrode; a control unit for controlling said operating mechanism; and a metallic container for containing said vacuum switch, said operation compartment and said control unit.

9. A vacuum switchgear comprising a vacuum switch according to claim 1, an operation compartment containing the operating mechanism for driving said movable electrode; a control unit for controlling said operating mechanism; and a metallic container for containing said vacuum switch, said operation compartment and said control unit.

10. A vacuum a switch comprising a first vacuum container; a second vacuum container disposed adjacent to said first vacuum container; a breaker having a first movable electrode which is gas-tightly sealed in said first vacuum container and driven by a first operating mechanism and electrically connected to a load side conductor and a first fixed electrode pairing with said first movable electrode; a grounding switch having a second movable electrode which is gas-tightly sealed in said second vacuum container and driven by a second operating mechanism and a second fixed electrode pairing with said second movable electrode and electrically connected to said first fixed electrode; and a isolator having a third movable electrode which is gas-tightly sealed in said vacuum container and driven by a third operating mechanism and electrically connected to said second fixed electrode and a third fixed electrode pairing with said third movable electrode and electrically connected to a bus side conductor.

11. A vacuum switch according to claim 10, wherein the electrical connection between the load side conductor and the first movable electrode, or between any of the respective fixed and movable electrodes, or between the third fixed electrode and the bus side conductor is performed using a flexible conductor.

12. A vacuum switchgear comprising a vacuum switch according to claim 10, an operation compartment containing the operating mechanism for driving said movable electrode; a control unit for controlling said operating mechanism; and a metallic container for containing said vacuum switch, said operation compartment and said control unit.

13. A vacuum switch comprising a first vacuum container; a second vacuum container disposed adjacent to said first vacuum container; a breaker having a first movable electrode which is gas-tightly sealed in said first vacuum container and driven by a first operating mechanism and electrically connected to a load side conductor and a first fixed electrode pairing with said first movable electrode; a grounding switch having a second movable electrode which is gas-tightly sealed in said first vacuum container and driven by a second operating mechanism and a second fixed electrode pairing with said second movable electrode and electrically connected to said first fixed electrode; and an isolator having a third movable electrode which is gas-tightly sealed in said second vacuum container and driven by a third operating mechanism and electrically connected to said second fixed electrode and a third fixed electrode pairing with said third movable electrode and electrically connected to a bus side conductor.

14. A vacuum switch according to claim 13, wherein the electrical connection between the load side conductor and the first movable electrode, or between any of the respective fixed and movable electrodes, or between the third fixed electrode and the bus side conductor is performed using a flexible conductor.

15. A vacuum switchgear comprising a vacuum switch according to claim 13, an operation compartment containing the operating mechanism for driving said movable electrode; a control unit for controlling said operating mechanism; and a metallic container for containing said vacuum switch, said operation compartment and said control unit.

16. A vacuum switch comprising a first vacuum container; a second vacuum container disposed adjacent to said first vacuum container; a grounding switch having a first movable electrode which is gas-tightly sealed in said first vacuum container and driven by a first operating mechanism and a first fixed electrode pairing with said first movable electrode and electrically connected to a load side conductor; an isolator having a second movable electrode which is gas-tightly sealed in said first vacuum container and driven by a second operating mechanism and electrically connected to said first fixed electrode and a second fixed electrode pairing with said second movable electrode; and a breaker having a third movable electrode which is gas-tightly sealed in said second vacuum container and driven by a third operating mechanism and electrically connected to said second fixed electrode and a third fixed electrode pairing with said third movable electrode and electrically connected to a bus said conductor.

17. A vacuum switch according to claim 16, wherein the electrical connection between the load side conductor and the first movable electrode, or between any of the respective fixed and movable electrodes, or between the third fixed electrode and the bus side conductor is performed using a flexible conductor.

18. A vacuum switchgear comprising a vacuum switch according to claim 16, an operation compartment containing the operating mechanism for driving said movable electrode; a control unit for controlling said operating mechanism; and a metallic container for containing said vacuum switch, said operation compartment and said control unit.

19. A vacuum switch comprising a first vacuum container; a second vacuum container disposed adjacent to said first vacuum container; a third vacuum container disposed adjacent to said second vacuum container; a breaker having a first movable electrode which is gas-tightly sealed in said first vacuum container and driven by a first operating mechanism and electrically connected to a load side conductor and a first fixed electrode pairing with said first movable electrode; a grounding switch having a second movable electrode which is gas-tightly sealed in said second vacuum container and driven by a second operating mechanism and a second fixed electrode pairing with said second movable electrode and electrically connected to said first fixed electrode; and an isolator having a third movable electrode which is gas-tightly sealed in said third vacuum container and driven by a third operating mechanism and electrically connected to said second fixed electrode and a third fixed electrode pairing with said third movable electrode and electrically connected to a bus side conductor.

20. A vacuum switch according to claim 19, wherein the electrical connection between the load side conductor and the first movable electrode, or between any of the respective fixed and movable electrodes, or between the third fixed electrode and the bus side conductor is performed using a flexible conductor.

21. A vacuum switchgear comprising a vacuum switch according to claim 19, an operation compartment containing the operating mechanism for driving said movable electrode; a control unit for controlling said operating mechanism; and a metallic container for containing said vacuum switch, said operation compartment and said control unit.

22. A vacuum switch comprising a first vacuum container; a second vacuum container disposed adjacent to said first vacuum container; a third vacuum container disposed adjacent to said second vacuum container; a grounding switch having a first movable electrode which is gas-tightly sealed in said first vacuum container and driven by a first operating mechanism and electrically connected to a load side conductor and a first fixed electrode pairing with said first movable electrode; a breaker having a second movable electrode which is gas-tightly sealed in said second vacuum container and driven by a second operating mechanism and electrically connected to said first fixed electrode and a second fixed electrode pairing with said second movable electrode; and an isolator having a third movable electrode which is gas-tightly sealed in said third vacuum container and driven by a third operating mechanism and electrically connected to said second fixed electrode and a third fixed electrode pairing with said third movable electrode and electrically connected to a bus side conductor.

23. A vacuum switch according to claim 22, wherein the electrical connection between the load side conductor and the first movable electrode, or between any of the respective fixed and movable electrodes, or between the third fixed electrode and the bus side conductor is performed using a flexible conductor.

24. A vacuum switchgear comprising a vacuum switch according to claim 22, an operation compartment containing the operating mechanism for driving said movable electrode; a control unit for controlling said operating mechanism; and a metallic container for containing said vacuum switch, said operation compartment and said control unit.

* * * * *